US009298327B2

(12) United States Patent
Wenzel

(10) Patent No.: US 9,298,327 B2
(45) Date of Patent: Mar. 29, 2016

(54) INTEGRATED SHIELDING IN TOUCH SENSORS

(71) Applicant: Thomas Wenzel, Heilbronn (DE)

(72) Inventor: Thomas Wenzel, Heilbronn (DE)

(73) Assignee: Atmel Corporation, San Jose, CA (US)

( * ) Notice: Subject to any disclaimer, the term of this patent is extended or adjusted under 35 U.S.C. 154(b) by 67 days.

(21) Appl. No.: 14/101,014

(22) Filed: Dec. 9, 2013

(65) Prior Publication Data

US 2015/0160754 A1    Jun. 11, 2015

(51) Int. Cl.
*G06F 3/044*    (2006.01)

(52) U.S. Cl.
CPC ...... *G06F 3/044* (2013.01); *G06F 2203/04107* (2013.01)

(58) Field of Classification Search
CPC ........................ G06F 3/044; G06F 2203/04107
See application file for complete search history.

(56) References Cited

U.S. PATENT DOCUMENTS

| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,564,556 | B2 * | 10/2013 | Lee et al. .................... 345/174 |
| 2008/0309635 | A1 | 12/2008 | Matsuo |
| 2009/0096761 | A1 * | 4/2009 | Cho ...................... G06F 3/044 345/174 |
| 2009/0315854 | A1 | 12/2009 | Matsuo |
| 2010/0085326 | A1 * | 4/2010 | Anno ..................... G06F 3/044 345/174 |
| 2011/0261010 | A1 * | 10/2011 | Nishitani ............... G06F 3/044 345/174 |
| 2012/0081328 | A1 * | 4/2012 | Kandziora ............ G06F 3/0412 345/174 |
| 2012/0146919 | A1 * | 6/2012 | Kim ..................... G06F 3/044 345/173 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0033450 | A1 * | 2/2013 | Coulson ................ G06F 3/044 345/174 |
| 2013/0076612 | A1 | 3/2013 | Myers |
| 2013/0093706 | A1 * | 4/2013 | Kurasawa ........... G06F 3/0412 345/173 |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — Tom Sheng
(74) *Attorney, Agent, or Firm* — Baker Botts L.L.P.

(57) ABSTRACT

In certain embodiments, a touch sensor includes a plurality of first electrodes, and a plurality of second electrodes. The plurality of second electrodes are separated from the plurality of first electrodes by an insulator and are operable, when operated by a controller, to capacitively couple with one or more first electrodes across the insulator. The touch sensor also includes a touch panel, a plurality of proximity electrodes, and a plurality of shield electrodes. Each shield electrode is associated with a respective proximity electrode of the plurality of proximity electrodes such that each shield electrode substantially surrounds its respective proximity electrode from a perspective orthogonal to a surface of the touch panel.

25 Claims, 7 Drawing Sheets

(56) References Cited

U.S. PATENT DOCUMENTS

| | | | |
|---|---|---|---|
| 2013/0154996 A1* | 6/2013 | Trend et al. | 345/174 |
| 2013/0181949 A1* | 7/2013 | Setlak | G06K 9/0002 345/175 |
| 2013/0257786 A1* | 10/2013 | Brown et al. | 345/174 |
| 2014/0049271 A1* | 2/2014 | Trend | 324/663 |
| 2014/0062934 A1* | 3/2014 | Coulson | G06F 3/044 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

INTEGRATED SHIELDING IN TOUCH SENSORS

TECHNICAL FIELD

This disclosure relates generally to touch sensor technology; and more particularly to integrated shielding in touch sensors.

BACKGROUND

A touch sensor may detect the presence and location of a touch or the proximity of an object (such as a user's finger or a stylus) within a touch-sensitive area of the touch sensor overlaid on a display screen. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A controller may process the change in capacitance to determine the position of the object relative to the touch screen.

The drawings included in the Figures are not drawn to scale.

DESCRIPTION OF EXAMPLE EMBODIMENTS

Figure 1:
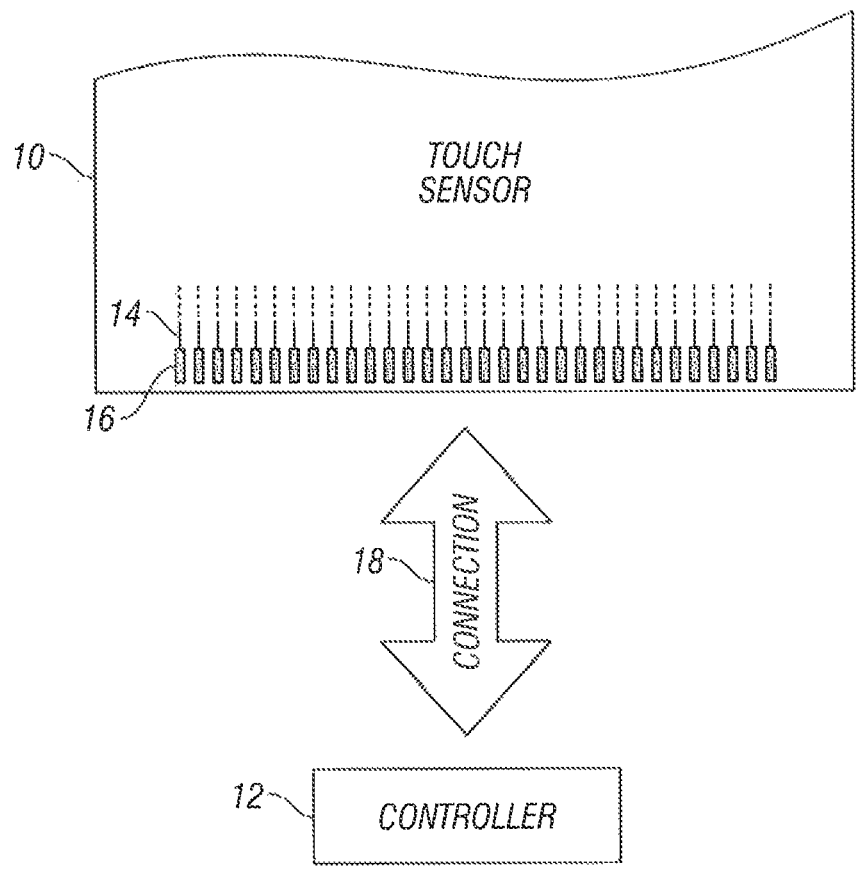
FIG. 1 illustrates an example touch sensor with an example controller that may be used in certain embodiments of the present disclosure.

FIG. 1 illustrates an example touch sensor 10 with an example controller 12, according to certain embodiments of the present disclosure. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor. Touch sensor 10 may include one or more touch-sensitive areas. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on. Alternatively, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM may encompass such material.

The shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of controller 12 and may be changed dynamically during the operation of device 2. For example, in some embodiments, multiple tracks 14 may be galvanically connected and sensed together, resulting in a capacitive node spanning multiple electrodes.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. A touch may refer to an external object touching a capacitive node directly or touching a cover or substrate adjacent to the capacitive node. By measuring changes in capacitance throughout the array, controller 12 may determine the position of the touch or proximity within the touch-sensitive area(s) of touch sensor 10. The change in capacitance measured by controller 12 may be referred to as a "delta capacitance." In certain embodiments, delta capacitance may be a difference or a ratio between the capacitance value measured or expected when the object and not present and the capacitance value measured during the sensing sequence. Delta capacitance may be measured relative to a baseline capacitance such as, for example, the capacitance measured when the external object is not present or the capacitance (or average capacitance) during one or more previous sensing sequences.

In a self-capacitance implementation, touch sensor 10 may include an array of electrodes of a single type that may each form a capacitive node. In such embodiments, a capacitive node may correspond to a single electrode, or a set of multiple connected electrodes, rather than an intersection of tracks 14. When an object touches or comes within proximity of the capacitive node, a change in self-capacitance may occur at the capacitive node and controller 12 may measure the change in capacitance, for example, as a change in the amount of charge needed to raise the voltage at the capacitive node by a predetermined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may be substantially perpendicular to sense lines, or drive lines and sense lines may cross at various angles. Herein, reference to a drive line may encompass one or more drive electrodes making up the drive line, and vice versa. Similarly, reference to a sense line may encompass one or more sense electrodes making up the sense line, and vice versa.

This disclosure contemplates electrodes disposed on any suitable number of substrates. For example, touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location at or near the position where the drive electrode and the sense electrode "cross" or come nearest each other in their respective planes. The drive and sense electrodes do not make electrical contact with each other-instead they are capacitively coupled to each other across a dielectric at the intersection. The "intersection" may therefore refer to the apparent crossing of the electrodes from a perspective orthogonal to the surface of touch sensor 10, as shown, for example, in FIG. 6). In some embodiments, this dielectric may be air, glass, plastic, or any suitable insulator. Such insulators are described further below with respect to insulator 80 of FIG. 7.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or ASICs) of a device that includes touch sensor 10 and controller 12, which may respond to the touch or proximity input by initiating a function of the device (or an application running on the device). Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs), such as for example general-purpose microprocessors, microcontrollers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of touch sensor 10, as described below. The FPC may be active or passive, where appropriate. In particular embodiments, multiple controllers 12 are disposed on the FPC. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components. Furthermore, various embodiments may have any suitable number of controllers 12 (see, for example, FIGS. 9A and 9B), and the functions of controller 12 described herein may be performed by one or more controllers 12.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and touch sensor 10.

Certain embodiments of touch sensor 10 and controller 12 may measure capacitance or a change in capacitance using any suitable method. For example, voltage may be applied to one or more tracks 14 by opening or closing one or more switches associated with one or more tracks 14. Such switches may connect one or more tracks 14 to other portions of touch sensor 10 or controller 12 such as, for example, a voltage source (e.g. a voltage supply rail), a current source, or any other suitable component. Such methods may cause charge to be transferred to or from one or more portions of one or more tracks 14. In some embodiments, one or more tracks 14 may be sensed to measure a value associated with their capacitance. During mutual-capacitance sensing, charged tracks 14 may induce a transfer of charge on one or more separate tracks 14, which may then be sensed by controller 12. During self-capacitance sensing, controller 12 may sense the same track 14 that was previously charged. The presence of an object such as a finger or a stylus may change the amount of charge present on the sensed track 14, and this change may be measured by controller 12 to determine the position of the object.

Certain embodiments may perform measurements using any suitable number of steps that facilitate capacitance measurements. For example, some embodiments may perform any suitable combination of pre-charging one or more tracks 14, charging one or more tracks 14, transferring charge between two or more tracks 14, discharging one or more tracks 14, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive node. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10. As used herein, "operation" of a track 14 and/or electrode by controller 12 refers to the application of voltage to and/or sensing of such components by controller 12 to facilitate touch and/or proximity sensing.

Figure 2:
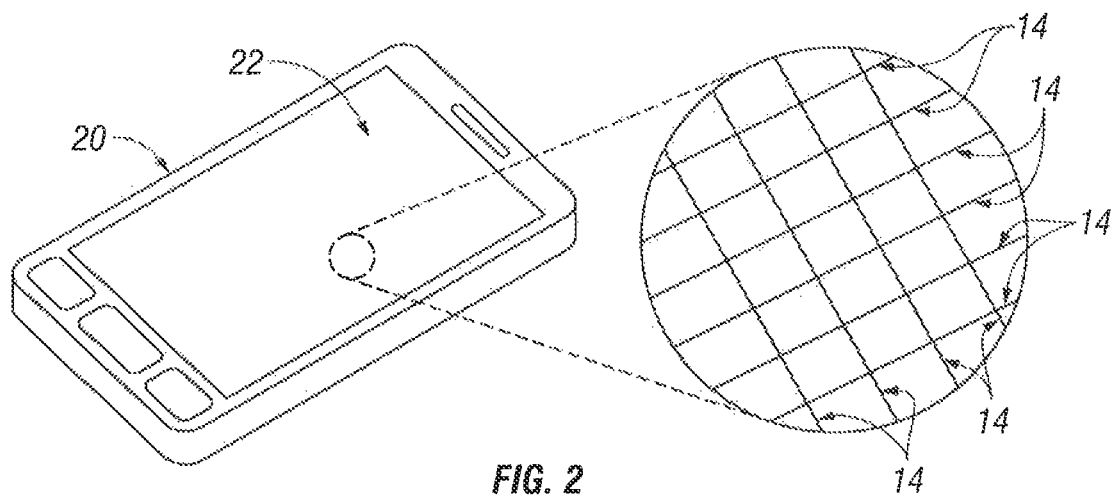
FIG. 2 illustrates an example device and example tracks that may be used in certain embodiments of the present disclosure.

FIG. 2 illustrates an example device 20 and example electrode tracks 14 that may be used in certain embodiments of the present disclosure. In the illustrated embodiment, device 20 includes display 21 and tracks 14.

In some embodiments, device 20 may utilize separate electrodes for touch sensing and proximity sensing. Touch detection may be performed using mutual capacitance sensing with two sets of electrodes, while proximity detection may be performed using self-capacitance sensing with proximity electrodes that are distinct from the mutual capacitance electrodes. Furthermore, shield electrodes may be positioned between the proximity electrodes and display 22 to reduce the distorting effects of other components on the self-capacitance measurements of the proximity electrodes. Forming the shield electrodes as part of an existing layer of touch sensor 10 may provide shielding without requiring an additional layer that would otherwise reduce the optical performance of the display. Shield electrodes may also provide shielding against interference caused by the mutual capacitance components that may still be connected to ground. Such shielding may allow touch sensor 10 to avoid spending time disconnecting and reconnecting certain components that might otherwise be needed to reduce interference while operating the proximity electrodes. This may allow faster switching between touch and proximity modes, which may improve the precision and linearity of touch sensor 10, particularly when estimating the position of faster-moving objects. Furthermore, some embodiments may have electrodes formed as outer rims having a gap, and shield or proximity electrodes may connect to adjacent shield or proximity electrodes via a track segment passing through these gaps. Such configurations may avoid the expense and/or complexity of utilizing bridging segments to cross over electrodes.

Device 20 may be any touch-sensing device or component. In various embodiments, device 20 may be a smartphone, tablet computer, laptop computer, touch pad, or any suitable device utilizing a touch sensor 10. Device 20 may include a display 21 that may be overlaid by or otherwise positioned proximate to touch sensor 10. Display 21 and touch sensor 10 may be substantially planar, curved, or have any other suitable configuration.

Tracks 14 may include any structure, configuration, and/or function described above with respect to FIG. 1. While the illustrated embodiment depicts certain tracks 14 running across display 21 perpendicular to certain other tracks 14, other embodiments may use any suitable configuration of tracks 14. For example, certain embodiments of tracks 14 may utilize different shapes, patterns, and/or configurations. Furthermore, certain embodiments may use different types, shapes, or configurations of tracks 14 within the same touch sensor 10. For example, in some embodiments, tracks 14 may be electrode "lines" that may be parallel, perpendicular or have any suitable orientation relative to other tracks 14. Such "lines" may include non-linear micro-features. Each track 14 may include multiple interconnected electrodes that are connected by other track segments. Such electrodes may have any suitable shape (e.g., square, round, triangular, hexagonal, or any other suitable shape), and some embodiments may include multiple types of electrodes. As used herein, track 14 may refer to electrodes, track segments interconnecting these electrodes, and/or tracks of conductive material connecting the electrodes to controller 12.

Figure 3A:
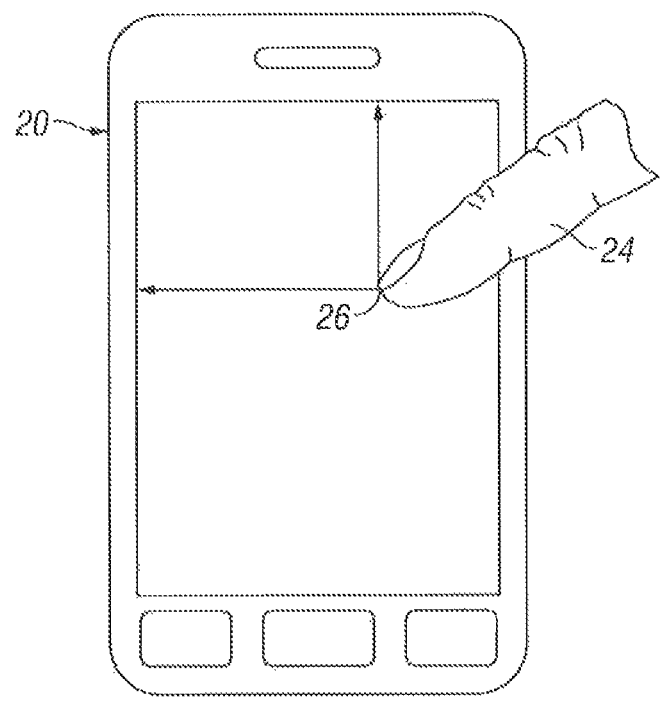
FIG. 3A illustrates an example position of an object that may be measured by certain embodiments of the present disclosure.
Figure 3B:
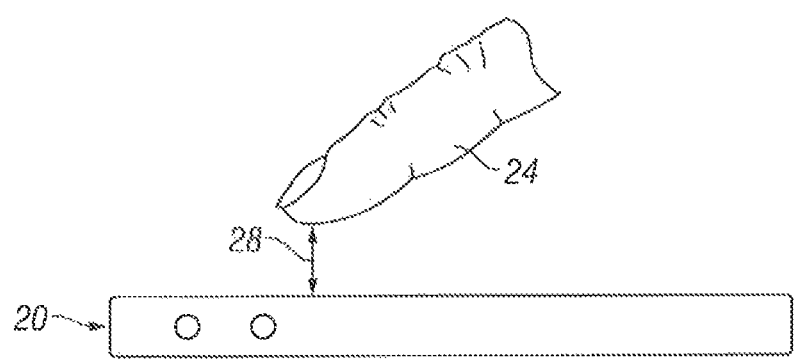
FIG. 3B illustrates an example position of an object that may be measured by certain embodiments of the present disclosure.

FIGS. 3A and 3B illustrate example positions of object 24 that may be measured by certain embodiments of the present disclosure. While illustrated as a finger, object 24 may be any object that can be detected by touch sensor 10 (e.g., a finger, a stylus, or any external object capable of affecting the capacitance of tracks 14).

FIG. 3A illustrates object 24 in contact with device 20 at touch location 26. Touch location 26 represents an orthogonal projection of a portion of object 24 onto touch sensor 10. Touch location 26 may therefore be a position where object 24 is making contact with touch sensor 10 or a position over which a portion of object 24 is hovering from a perspective orthogonal to touch sensor 10. Touch location 26 may be estimated by mutual-capacitance sensing and/or self-capacitance sensing, though some embodiments may primarily use mutual-capacitance sensing (e.g., using electrodes 30 and 50 of FIGS. 4-6) to measure touch location 26, which may be referred to as "touch mode."

FIG. 3B illustrates a side view showing object 24 positioned above device 20, separated by distance 28. In such positions, object 24 may be detected as "hovering." Proximity detection may involve detecting a threshold delta capacitance or estimating that object 24 is within a threshold distance from touch sensor 10. Some embodiments may utilize more granular proximity sensing by triggering different functions based on the particular delta capacitance or distance 28 measured by controller 12. Distance 28 may be estimated by mutual-capacitance sensing and/or self-capacitance sensing, though some embodiments may primarily use self-capacitance sensing (e.g., using electrodes 60 of FIGS. 5 and 6) to perform proximity detection, which may be referred to as "hover mode" or "proximity mode."

As used herein, "proximity" detection or "hover" detection may include detecting the presence of an object within a threshold distance of touch sensor 10, estimating the distance between the object and touch sensor 10, determining whether the delta capacitance (or a related value) exceeds a threshold amount, or any suitable combination thereof. "Proximity" or "hover" detection may also include estimating a position of the object within a touch sensitive area of touch sensor 10, such as, for example, an orthogonal projection of a portion of the object onto touch sensor 10. Different embodiments may have different levels of granularity for such measurements. For example, some embodiments may estimate a particular point or area over which the object is hovering, while other embodiments may determine a broader sector of touch sensor 10 over which the object is hovering. Some embodiments may measure the position of object 24 using any suitable combination of positional components. For example, in an embodiment where the surface of touch sensor 10 lies in the X-Y plane and the Z axis is orthogonal to the X-Y plane, the position may correspond to the X coordinates of the object, Y coordinates, Z coordinates (e.g. distance 28), X-Y coordinates (e.g., touch location 26), X-Z coordinates, Y-Z coordinates, X-Y-Z coordinates, any reference position correlating with X, Y, or Z coordinates, or any other suitable position information.

In certain embodiments, the same measured values may be used to determine both the distance 28 and touch location 26, while other embodiments may determine such positions using separate measurements. Controller 12 may also factor in additional measurements and/or calculations to determine the position of object 24. For example, multiple tracks 14 may be sensed synchronously or in close succession, and the position of the object may be determined based on a calculation factoring in each of these measurements. Furthermore, certain embodiments may utilize weighted averages, linear approximation, or any suitable combination thereof to facilitate the determination of the position of object 24. Some embodiments may also determine a position of multiple objects 24 such as, for example, multiple fingers touching device 20 simultaneously.

Figure 4:
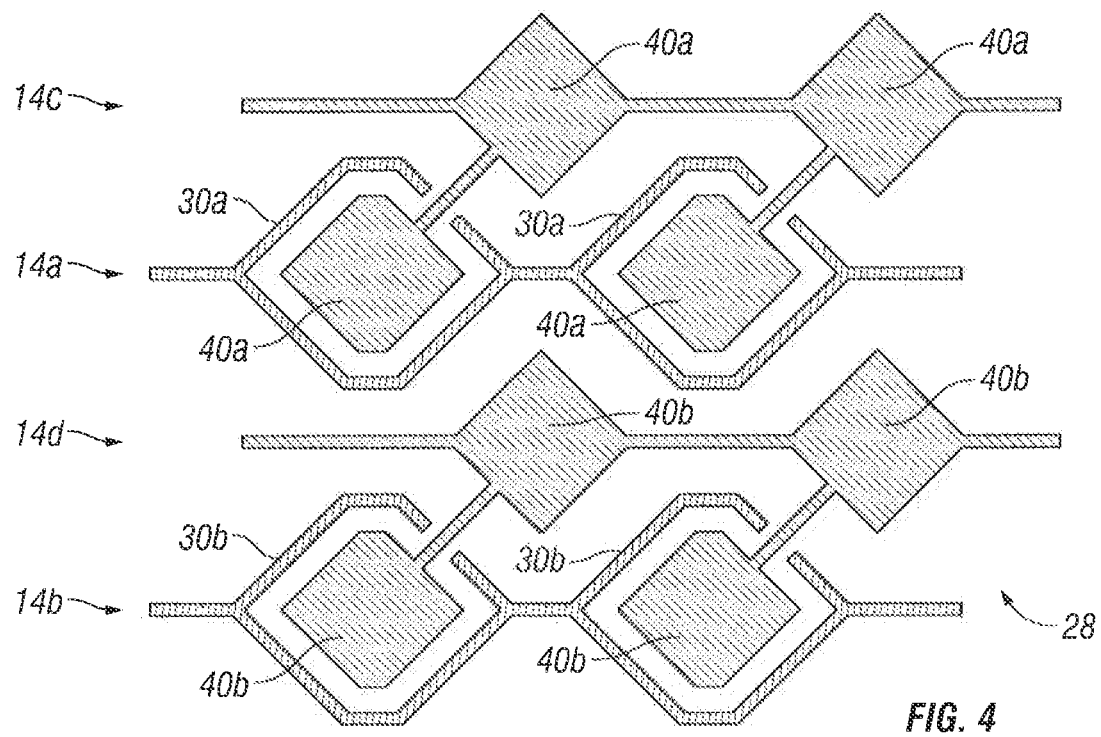
FIG. 4 illustrates example electrodes that may be used in certain embodiments of a touch sensor.
Figure 5:
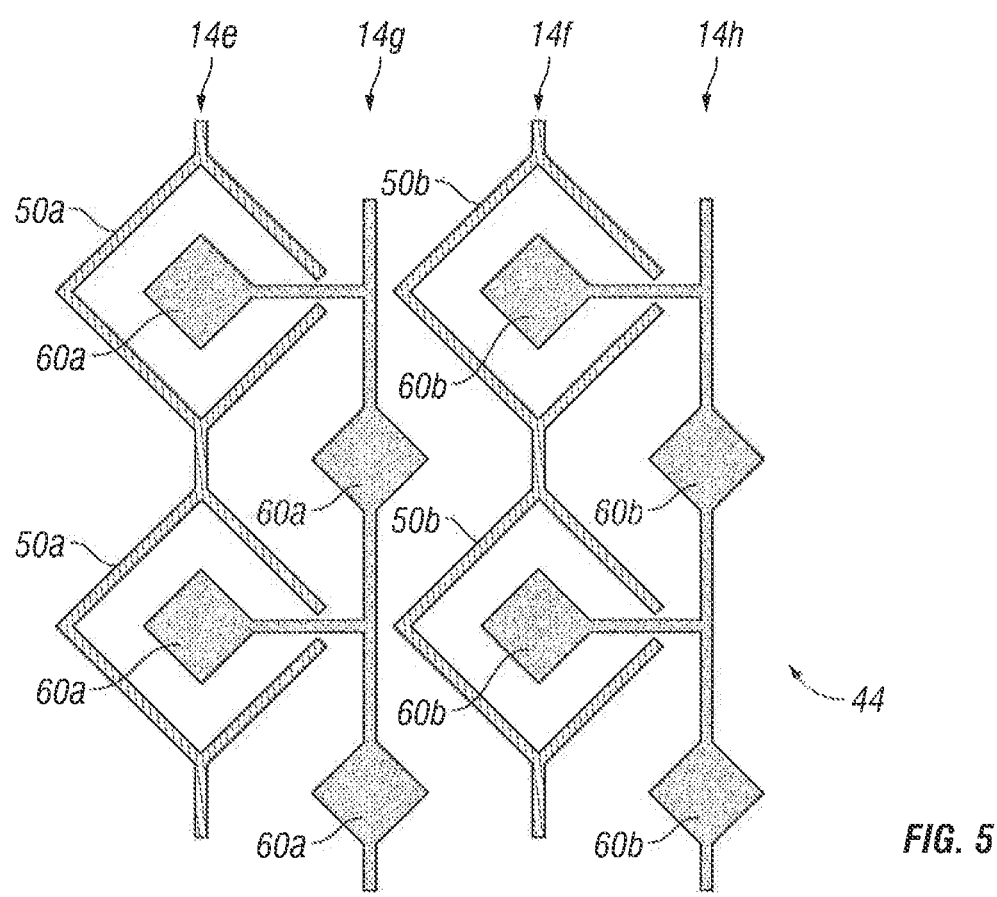
FIG. 5 illustrates example electrodes that may be used in certain embodiments of a touch sensor.
Figure 6:
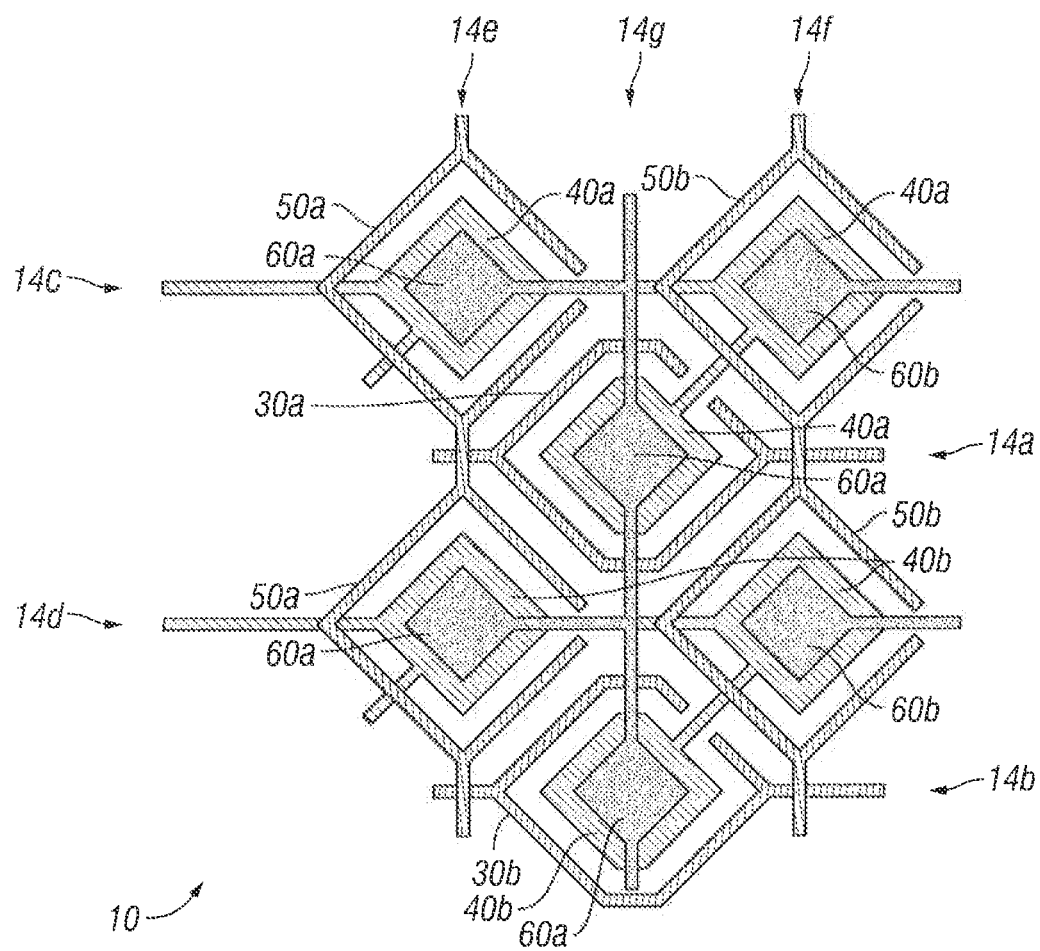
FIG. 6 illustrates example electrodes that may be used in certain embodiments of a touch sensor.

FIGS. 4-6 illustrate example electrodes that may be used in certain embodiments of touch sensor 10. FIGS. 4 and 5 illustrate separate layers of touch sensor 10, and FIG. 6 illustrates these layers overlaid. Layer 28 represents an inner layer between layer 44 and display 22 (as shown, for example, in FIG. 7). FIGS. 4-6 are shown from a perspective orthogonal to the outer surface of touch sensor 10, similar to the perspective of FIG. 3A.

Layers 28 and 44 each include components disposed within a respective layer of touch sensor 10. In substantially flat embodiments of touch sensor 10, these layers may include coplanar components. The components of each layer may be disposed on the same or different substrates. For example, they may be disposed on the same side of the same substrate or on different sides of adjacent substrates. In the illustrated embodiments, layer 28 includes tracks 14a-14d, and layer 44 includes tracks 14e-14h. Tracks 14a-14h may have any structure, configuration, and/or function described above with respect to tracks 14 of FIGS. 1 and 2. While tracks 14 are depicted as having particular configurations of electrodes, any suitable configurations may be used.

Track 14a and 14b include electrodes 30a and 30b, respectively. Electrodes 30 are operable to perform mutual capacitance sensing in conjunction with electrodes 50 of FIG. 5. Electrodes 30 may be operated by controller 12 as drive electrodes and/or sense electrodes. For example, when one or more electrodes 30 are driven, one or more electrodes 50 may be sensed, and vice versa. Electrodes 30 may have any structure, configuration, and/or function described above with respect to tracks 14 of FIGS. 1 and 2. For example, electrodes 30 may be composed of ITO, metal or any other suitable conductive material, or any suitable combination thereof. In the illustrated embodiment, each electrode 30 includes an outer rim that is formed approximately in the shape of a hexagon, though any suitable shape may be used. For example, electrodes 30 may be triangular, quadrilateral, curved, or any suitable shape. Electrodes 30 may also include a gap through which segments connecting adjacent shield electrodes 40 may pass. Such configurations may allow electrodes 30 and shield electrodes 40 to be formed in a single layer without requiring bridges to allow shield electrodes 40 to cross over the outer rims of electrodes 30. This may reduce costs since such extra layers and/or bridging may be more expensive and/or difficult to implement. However, other embodiments may utilize bridging. While tracks 14a and 14b are shown extending from left to right, other embodiments may have such tracks 14 oriented in any suitable direction.

Tracks 14c and 14d include shield electrodes 40a and 40b, respectively. Shield electrodes 40 may "shield" proximity electrodes 60 (shown in FIG. 5) from certain electrical interference. For example, display 22 may generate an electrical field that might otherwise interfere with the capacitive measurements of proximity electrodes 60. To facilitate such shielding, controller 12 may apply voltage to shield electrodes 40 during a portion of the sensing sequence for proximity electrodes 60, which may allow shield electrodes to mitigate the distorting effects of display 22 and/or ground on the electrical field of proximity electrodes 60. Shield electrodes 40 may have any structure, configuration, and/or function described above with respect to tracks 14 of FIGS. 1 and 2. In the illustrated embodiment, shield electrodes 40 are formed as hexagons and diamonds. However, any suitable shape may be used. Certain shield electrodes 40 may be positioned within the outer rim of an associated electrode 30, connecting to an adjacent shield electrode 40 through the gap of the associated electrode 30. As explained above, this may allow electrodes 30 and shield electrodes 40 to be formed in a single layer without requiring bridges to allow shield electrodes 40 to cross over the outer rims of electrodes 30, which may reduce costs and/or complexity. However, other embodiments may utilize bridging. Furthermore, having distinct shield electrodes 40 within the same layer 24 as electrodes 30 may allow shielding without requiring an additional shielding layer between display 22 and the shielded electrodes. Reducing the number of layers in this manner may reduce optical degradation of the displayed image and production costs.

Track 14e and 14f include electrodes 50a and 50b, respectively. Electrodes 50 are operable to perform mutual capacitance sensing in conjunction with electrodes 30 of FIG. 4. Electrodes 50 may be operated by controller 12 as drive electrodes and/or sense electrodes. For example, when one or more electrodes 30 are driven, one or more electrodes 50 may be sensed, and vice versa. Electrodes 50 may have any structure, configuration, and/or function described above with respect to tracks 14 of FIGS. 1 and 2. In the illustrated embodiment, each electrode 50 includes an outer rim that is formed approximately in the shape of a diamond, though any suitable shape may be used. For example, electrodes 50 may be triangular, hexagonal, curved, or any suitable shape. Electrodes 50 may also include a gap through which segments connecting adjacent proximity electrodes 60 may pass. Such configurations may allow electrodes 50 and proximity electrodes 60 to be formed in a single layer without requiring bridges to allow proximity electrodes 60 to cross over the outer rims of electrodes 50. This may reduce costs since such bridging may be more expensive and/or difficult to implement. However, other embodiments may utilize such bridging. While tracks 14e and 14f are shown extending vertically, other embodiments may have such tracks 14 oriented in any suitable direction.

Figure 8A:
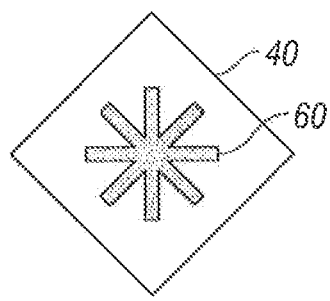
FIG. 8A illustrates an example proximity electrode that may be used in certain embodiments of a touch sensor.
Figure 8B:
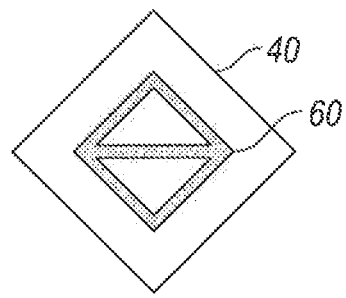
FIG. 8B illustrates an example proximity electrode that may be used in certain embodiments of a touch sensor.
Figure 8C:
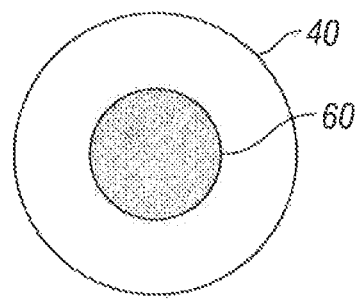
FIG. 8C illustrates an example proximity electrode that may be used in certain embodiments of a touch sensor.

Tracks 14g and 14h include proximity electrodes 60a and 60b, respectively. Proximity electrodes 60 may be operated by controller 12 to perform self-capacitance measurements, which may provide proximity detection as described above. These measurements may be affected by radiation from display 22 or other components. For example, display 22 may generate an electrical field that may otherwise interfere with the capacitive measurements of proximity electrodes 60. As another example, if electrodes 30 and/or 50 are connected to ground while proximity electrodes 60 are being measured, exposure to ground from the backside may reduce the sensitivity of proximity electrodes 60. Shielding proximity electrodes 60 using shield electrodes 40, as described above, may mitigate such problems. Proximity electrodes 60 may have any structure, configuration, and/or function described above with respect to tracks 14 of FIGS. 1 and 2. In the illustrated embodiment, proximity electrodes 60 are formed as diamonds, though any suitable shape may be used. Examples of other possible shapes are shown in FIGS. 8A-8C. Certain proximity electrodes 60 may be positioned within the outer rim of an associated electrode 50, connecting to an adjacent proximity electrode 60 through the gap of the associated electrode 50. As explained above, this may allow electrodes 50 and proximity electrodes 60 to be formed in a single layer without requiring bridges to allow proximity electrodes 60 to cross over the outer rims of electrodes 50, which may reduce costs and/or complexity. However, other embodiments may utilize such bridging.

FIG. 6 illustrates layers 28 and 44 from a perspective orthogonal to touch sensor 10. As shown in FIG. 6, each shield electrode 40 is positioned beneath a respective proximity electrode 60, and, from a perspective orthogonal to the surface of touch sensor 10, each shield electrode 40 substantially surrounds its respective proximity electrode 60. This configuration may allow shield electrodes 40 to reduce interference from display 22, electrodes 30 and 50, and/or other components. Furthermore, because shield electrodes 40 are formed within and around electrodes 30, shielding can be provided without requiring a separate shield layer, which may reduce cost and improve optical performance. Various embodiments may use different relative sizes of shield electrodes 40 and proximity electrodes 60. For example, the width of shield electrodes 40 may be at least 1%, 5%, 25%, 50%, 75%, 100%, or any suitable amount greater than the width of their respective proximity electrodes 60. In other embodiments, the width of shield electrode 40 is the same as or shorter than the width of the respective proximity electrode 60. Increasing the overhang of shield electrodes 40 beyond the edge their respective proximity electrodes 60 may improve the shielding effect. Furthermore, greater separation between layers 28 and 44 may require greater overhang to achieve equivalent levels of shielding.

Figure 7:
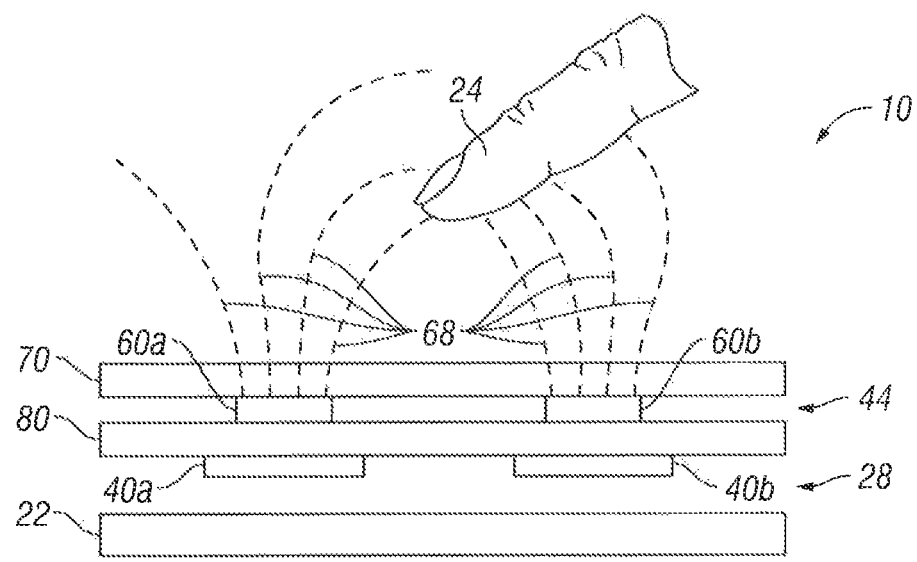
FIG. 7 illustrates a cross-sectional view of example components that may be used in certain embodiments of a touch sensor.

FIG. 7 illustrates a cross-sectional view of an example touch sensor 10. In the illustrated embodiment, touch sensor 10 includes touch panel 70, layer 44, insulator 80, layer 28, and display 22. For purposes of simplified illustration, layer 44 is shown including only proximity electrodes 60 (which generate electric field lines 68), and layer 28 is shown including only shield electrodes 40. Other components have also been omitted from FIG. 7 for clarity purposes. Display 22, object 24, layers 28 and 44, shield electrodes 40, and proximity electrodes 60 may have any structure, configuration, and/or function described above with respect to their respective components.

Electric field lines 68 represent the electric field generated by proximity electrodes 60, which are affected by object 24. For purposes of simplified illustration, only a small number of electric field lines 68 are shown. As illustrated in FIG. 7, the presence of object 24 may distort electric field lines 68, which may affect the capacitance of proximity electrodes 60. This change in capacitance may be detected by controller 12 and interpreted as a hover or touch. When shield electrodes 40 are active during the operation of proximity electrodes 60, the distorting effects of display 22, ground, or other components of touch sensor 10 on electric field lines 68 may be mitigated. Furthermore, such shielding may mitigate the reduced sensitivity that may otherwise be caused by the ground load during the operation of proximity electrodes 60.

Touch panel 70 may be any material on the external side of touch sensor 10 that can be touched by object 24. Touch panel 70 may be glass, plastic, or any suitable material through which electric fields generated by tracks 14 may interact with object 24. In certain embodiments, touch panel 70 may be transparent, though this is not required. Touch panel 70 may be formed as a separate layer from tracks 14, and in such embodiments, touch panel 70 may be affixed to a portion of touch sensor 10 via an adhesive. In some embodiments, touch panel 70, tracks 14, and/or one or more substrates may be integrally formed.

Insulator 80 is operable to separate electrodes 30 and 50 (not shown) to facilitate mutual capacitance sensing between drive and sense electrodes. Insulator 80 may be a dielectric material or any suitable insulator. For example, insulator 80 may be glass, plastic, air, any suitable material, or any suitable combination thereof. While insulator 80 is illustrated as a single, uniform layer, other embodiments may utilize a non-uniform layer or any suitable configuration. For example, insulator 80 may be composed of multiple distinct insulator components separating the electrodes of touch sensor 10. As discussed above, embodiments with different thicknesses of insulator 80 may use different configurations of shield electrodes 40 and proximity electrodes 60.

FIGS. 8A-8C illustrate example configurations of shield electrodes 40 and proximity electrodes 60. Shield electrode 40 is shown with diamond and circular shapes, though any suitable shape may be used. Proximity electrode 60 is shown with snowflake (or asterisk), polygonal, and circular shapes, though any suitable shape may be used. The particular shapes shown in FIGS. 8A-8C are intended only as examples of the various configurations each of these components may have in certain embodiments. As explained above, shield electrode 40 may extend beyond the outer edge of proximity electrode 60 to provide improved shielding from underlying interference without using a separate layer dedicated to shielding.

Figure 9A:
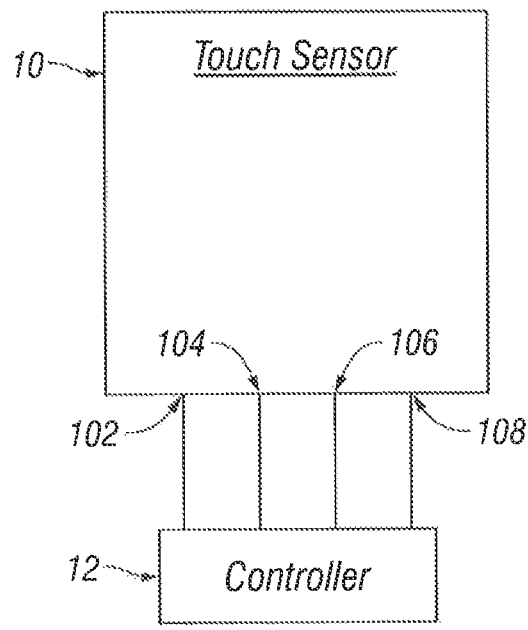
FIG. 9A illustrates an example touch sensor with an example controller that may be used in certain embodiments of the present disclosure.
Figure 9B:
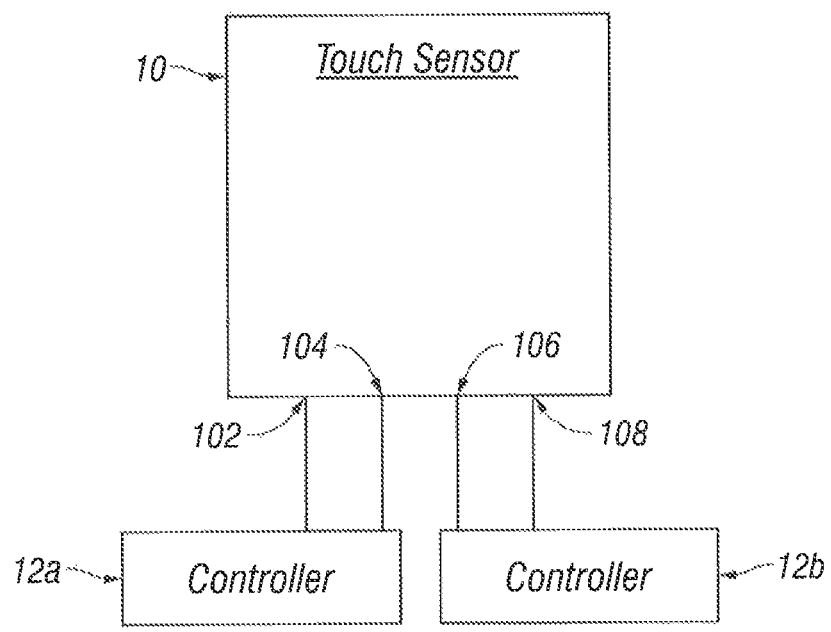
FIG. 9B illustrates an example touch sensor with example controllers that may be used in certain embodiments of the present disclosure.

FIGS. 9A and 9B illustrate different configurations of controller 12. In the illustrated embodiments, touch sensor 10 connects to one or more controllers 12 via connections 102, 104, 106, and 108. Connections 102 and 104 represent connections between controller 12 and electrodes 30 and electrodes 50, respectively. For example. Connection 102 may connect one or more X lines to controller 12, while connection 104 may connect one or more Y lines to controller 12. Similarly, connections 106 and 108 represent connections between controller 12 and shield electrodes 40 and proximity electrodes 60, respectively. Each connection may represent one or more connections of tracks 14 to controller 12.

In FIG. 9A, connections 102, 104, 106, and 108 connect to a single controller 12. External multiplexers may mitigate certain desensitizing effects of grounded mutual capacitance electrodes on proximity sensing, but such an approach may involve additional expenses. In FIG. 9B, connections 102 and 104 connect to controller 12a, and connections 106 and 108 connect to controller 12b. With multiple controllers 12, disconnecting ground and/or voltage supply lines from controller 12a during proximity sensing may mitigate certain desensitizing effects discussed above, but this may be more time consuming due to the extra time spent discharging, reconnecting, and initializing components. Utilizing shield electrodes 40 as described above may provide these benefits without the added expense and/or operational delays.

Figure 10:
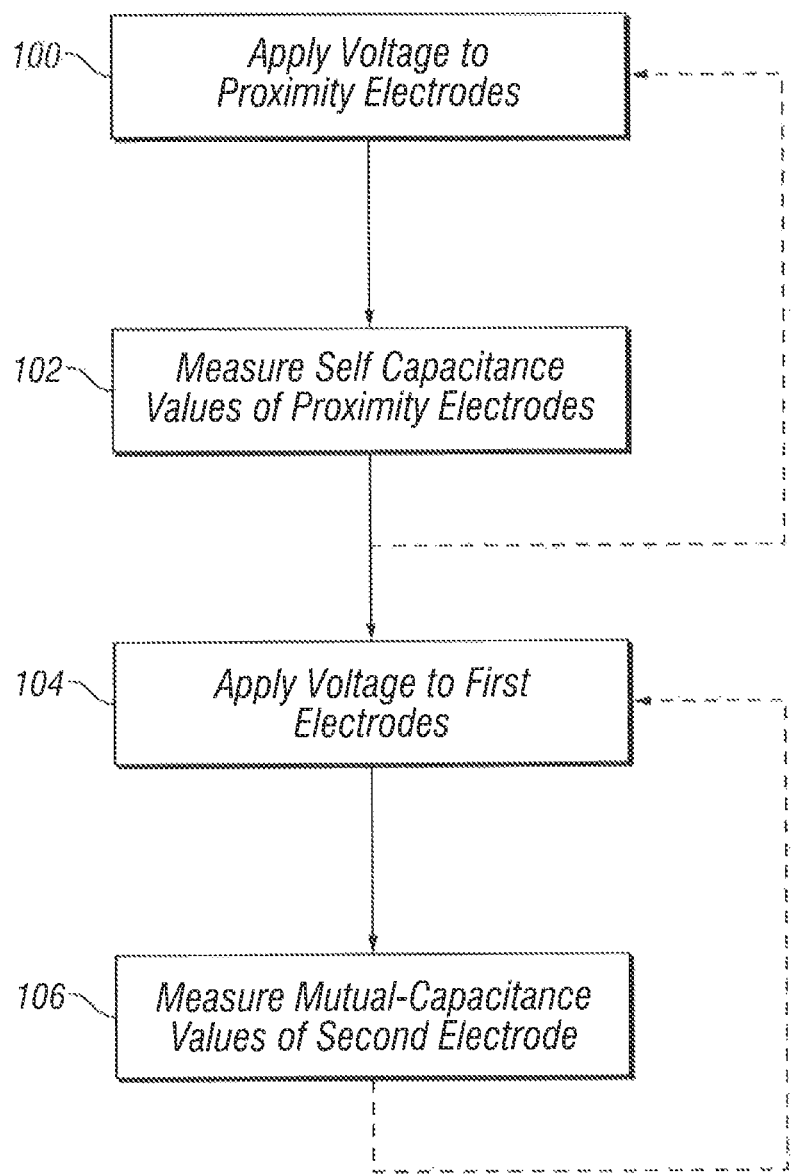
FIG. 10 illustrates an example method for use with certain embodiments of a touch sensor.

FIG. 10 illustrates an example method for use with certain embodiments of touch sensor 10. Various embodiments may perform some, all, or none of the steps described below. Furthermore, certain embodiments may perform these steps in different orders or in parallel, and certain embodiments may also perform additional steps. Moreover, any suitable component of touch sensor 10 and/or controller 12 may perform one or more steps of the sensing sequence.

At step 100, controller 12 applies voltage to one or more proximity electrodes 60, which may include charging one or more tracks 14. Connecting larger numbers of electrodes 60 may improve the sensitivity of the proximity detection, but it may also reduce the ability to detect the position of object 24 within the plane of touch sensor 10. Dividing such tracks 14 into sectors may improve the ability of touch sensor 10 to distinguish the position of a hovering object over different portions of touch sensor 10. While charging proximity electrodes 60, controller 12 may also apply voltage to shield electrodes 40 to provide shielding against interference and/or desensitization caused by display 22, electrodes 30, electrodes 50, ground, and/or other components of device 20. Each shield electrode 40 may be associated with a respective proximity electrode 60 such that, from a perspective orthogonal to the surface of touch sensor 10, each shield electrode substantially surrounds its respective proximity electrode. Configuring shield electrodes 40 to fit within the same layer as electrodes 30 may reduce the number of layers needed in touch sensor 10, which may improve optical performance and reduce production costs. Shielding without disconnecting mutual capacitance components from ground and/or the voltage driver may allow faster switching between touch mode (e.g., mutual-capacitance sensing with electrodes 30 and 50) and proximity mode (e.g., self-capacitance sensing with proximity electrodes 60). This improved speed may increase the precision and/or linearity of touch and/or proximity measurements, particularly when detecting the position of a fast-moving object.

At step 102, controller 12 measures self-capacitance values of proximity electrodes 60. As explained above, controller 12 may apply voltage to shield electrodes 40 during all or part of this process to provide shielding against interference and/or desensitization that may otherwise be caused by display 22, electrodes 30, electrodes 50, ground, and/or other components of device 20. Self-capacitance values may include actual capacitance measurements or other values that serve as a proxy for or otherwise indicate capacitance. For example, controller 12 may measure the change in voltage as proxy for the delta capacitance.

After the self-capacitance values are measured, controller 12 may estimate a proximity position based at least on the self-capacitance values measured during step 102. In some embodiments, multiple measurements may have been taken synchronously or in close succession, and the proximity position of object 24 may be determined based on a calculation factoring in one or more of these measurements. For example, after step 102, the sensing sequence may return to step 100 to obtain additional proximity measurements, and controller 12 can utilize multiple sets of such measurements to estimate the proximity of the object. Certain embodiments may also utilize additional processing such as weighted averages, linear approximation, and/or any suitable post-processing to facilitate the determination of the proximity position. Proximity detection may indicate the presence of object 24, a distance between object 24 and touch sensor 10 (e.g., distance 28 from FIG. 3B), and/or the position of the object as an orthogonal projection of object 24 onto touch sensor 10 (e.g., when electrodes 60 are divided into multiple sectors, each sector being measured separately).

After performing proximity detection, the sensing sequence may return to step 100 to continue taking proximity measurements, or it may continue to step 104. As a particular example, some embodiments continue in proximity mode while an object remains outside of a threshold distance from touch sensor 10. Such embodiments can then proceed to step 104, transitioning from "proximity mode" to "touch mode," after detecting that an object has moved within the threshold distance. Certain embodiments may proceed to step 104 based on any suitable criteria.

At step 104, controller 12 applies voltage to one or more first electrodes, such as electrodes 30 or electrodes 50, which may include charging one or more tracks 14. Where voltage is applied to electrodes 30 in this step, electrodes 50 are measured in step 106. Similarly, where voltage is applied to electrodes 50 in this step, electrodes 30 are measured in step 106. Charging the first electrodes may induce charge on the mutual capacitance electrodes of the other layer, and the amount of charge induced may differ depending on the presence and/or position of an external object such as object 24.

At step 106, controller 12 measures the mutual capacitance values associated with one or more second electrodes. Mutual capacitance values may refer to capacitance directly or other values that may serve as a proxy for or otherwise indicate capacitance. For example, controller 12 may measure the voltage on one or more sense lines. As explained above, where voltage is applied to electrodes 30 in step 104, electrodes 50 are measured in step 106. Similarly, where voltage is applied to electrodes 50 in step 104, electrodes 30 are measured in step 106. Multiple tracks 14 can be charged and/or sensed synchronously or in close succession to provide mutual-capacitance values corresponding to multiple capacitive nodes throughout touch sensor 10.

After the mutual-capacitance values are measured during step 106, controller 12 may estimate a touch location based at least on the mutual capacitance values. As discussed above, multiple measurements may be taken synchronously or in close succession, and the position of object 24 may be determined based on a calculation factoring in each of these measurements. For example, the sensing sequence may return to step 104 after step 106, and the touch location can be estimated using one or more sets of mutual-capacitance values. Some embodiments may also factor in one or more proximity measurements when estimating the touch location. Controller 12 may also utilize additional processing such as weighted averages, linear approximation, and/or any suitable post-processing to facilitate the determination of the touch location. In some embodiments, the touch location corresponds to an orthogonal projection of a portion of object 24 onto touch sensor 10 (such as, for example, touch position 26 of FIG. 3A).

After measuring estimating a touch location of the object, controller 12 may return to step 100 or step 104. For example, if measurements taken during step 106 indicate that the object has moved beyond a threshold distance from touch sensor 10, controller 12 may transition to proximity mode by returning to step 100. As another example, controller 12 may repeatedly estimate the touch location of the object (as described, for example, with respect to steps 104 and 106) to provide substantially continuous touch detection while the object is in contact with touch sensor 10. Other embodiments may proceed to step 100, proceed to step 104, or perform other functions based on any suitable criteria.

The above steps may be repeated any number of times to provide substantially continuous touch or proximity detection. These steps need not be performed in the exact order described above. For example, multiple mutual-capacitance measurements can be taken successively, followed by multiple self-capacitance measurements. Controller 12 may then process the data together or in parallel to estimate the position of object 24.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the embodiments of FIGS. 4-7 illustrate particular configurations of electrodes 30, 40, 50, and 60, any suitable number, type, and configuration may be used. As another example, while in certain embodiments electrodes 30 and shield electrodes 40 may be disposed on the same substrate or layer, other embodiments may have these components on separate substrates or layers. As yet another example, while this disclosure describes certain touch-sensing operations that may be performed using the components of touch sensor 10 and controller 12, any suitable touch-sensing operations may be performed. Furthermore, certain embodiments may alternate between or combine one or more touch-sensing methods described herein. For example, some embodiments may alternate between mutual-capacitance sensing and self-capacitance sensing as described above.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
    a touch panel;
    a plurality of first electrodes;
    a plurality of second electrodes separated from the plurality of first electrodes by an insulator, wherein the second electrodes are operable, when operated by a controller, to capacitively couple with one or more first electrodes across the insulator;
    a plurality of proximity electrodes;
    a plurality of shield electrodes, each shield electrode associated with a respective proximity electrode of the plurality of proximity electrodes such that each shield electrode substantially surrounds its respective proximity electrode from a perspective orthogonal to a surface of the touch panel; and
    a controller configured to selectively apply a voltage to the plurality of shield electrodes to provide shielding against interferences.

2. The touch sensor of claim 1, wherein:
    the plurality of first electrodes and the plurality of proximity electrodes define a first layer;
    the plurality of second electrodes and the plurality of shield electrodes define a second layer; and
    the plurality of first electrodes are separated from the plurality of second electrodes by an insulator.

3. The touch sensor of claim 1, wherein:
    the plurality of first electrodes and the plurality of second electrodes are operable, when operated by a controller, to perform mutual-capacitance sensing; and
    the plurality of proximity electrodes are operable, when operated by a controller, to perform self-capacitance sensing.

4. The touch sensor of claim 1, wherein one or more of the second electrodes comprises an outer rim substantially surrounding, from a perspective orthogonal to the touch panel, a respective shield electrode of the plurality of shield electrodes.

5. The touch sensor of claim 4, wherein:
    each outer rim defines a gap; and
    each respective shield electrode is connected to an adjacent shield electrode via a track segment passing through the gap defined by the outer rim of the respective second electrode.

6. The touch sensor of claim 1, wherein one or more of the first electrodes comprises an outer rim substantially surrounding, from a perspective orthogonal to the touch panel, a respective proximity electrode of the plurality of proximity electrodes.

7. The apparatus of claim 6, wherein:
    each outer rim defines a gap; and
    each respective proximity electrode is connected to an adjacent proximity electrode via a track segment passing through the gap defined by the outer rim of the respective first electrode.

8. The touch sensor of claim 1, wherein:
    the first and second electrodes are connected to a first controller; and
    the proximity electrodes are connected to a second controller.

9. An apparatus comprising:
    a touch sensor comprising:
        a touch panel;
        a display;
        a plurality of first electrodes;
        a plurality of second electrodes separated from the plurality of first electrodes by an insulator, wherein the second electrodes are operable, when operated by a controller, to capacitively couple with one or more first electrodes across the insulator;
        a plurality of proximity electrodes; and
        a plurality of shield electrodes positioned substantially between the plurality of proximity electrodes and the display, each shield electrode associated with a respective proximity electrode of the plurality of proximity electrodes such that each shield electrode substantially surrounds its respective proximity electrode from a perspective orthogonal to a surface of the touch panel; and controller circuitry configured to:
measure one or more first values indicating the capacitance of one or more proximity electrodes; and
estimate, based at least on the one or more first values, a position of an object indicating a distance between the object and the touch sensor;
measure one or more second values indicating the capacitance of one or more of the first and second electrodes;
estimate, based at least on the one or more second values, a touch location corresponding to an orthogonal projection of a portion of the object onto the touch sensor; and
selectively provide voltage to the plurality of shield electrodes to provide shielding against interferences.

10. The apparatus of claim 9, wherein:
the plurality of first electrodes and the plurality of proximity electrodes define a first layer; and
the plurality of second electrodes and the plurality of shield electrodes define a second layer positioned between the first layer and the display.

11. The apparatus of claim 9, wherein:
the plurality of first electrodes and the plurality of second electrodes are operable, when operated by a controller, to perform mutual-capacitance sensing; and
the plurality of proximity electrodes are operable, when operated by a controller, to perform self-capacitance sensing.

12. The apparatus of claim 9, wherein one or more of the second electrodes comprises an outer rim substantially surrounding, from a perspective orthogonal to the touch panel, a respective shield electrode of the plurality of shield electrodes.

13. The apparatus of claim 12, wherein:
each outer rim defines a gap; and
each respective shield electrode is connected to an adjacent shield electrode via a track segment passing through the gap defined by the outer rim of the respective third electrode.

14. The apparatus of claim 9, wherein one or more of the first electrodes comprises an outer rim substantially surrounding, from a perspective orthogonal to the touch panel, a respective proximity electrode of the plurality of proximity electrodes.

15. The apparatus of claim 14, wherein:
each outer rim defines a gap; and
each respective proximity electrode is connected to an adjacent proximity electrode via a track segment passing through the gap defined by the outer rim of the respective first electrode.

16. The apparatus of claim 9, wherein the controller circuitry comprises:
a first controller configured to measure the one or more first values;
a second controller configured to measure the one or more second values.

17. The apparatus of claim 9, wherein the controller circuitry is further configured to apply voltage to the one or more shield electrodes at least during the application of voltage to the one or more proximity electrodes.

18. A method of operating a touch sensor, the method comprising:

applying, by a controller, voltage to one or more proximity electrodes of the touch sensor, the proximity electrodes at least partially shielded from a display of the touch sensor by one or more shield electrodes of the touch sensor, the proximity electrodes receiving a voltage from the controller to provide shielding against interferences, each shield electrode positioned substantially between a respective proximity electrode and the display such that each shield electrode substantially surrounds its respective proximity electrode from a perspective orthogonal to a surface of the touch sensor;
measuring one or more first values indicating the capacitance of one or more proximity electrodes;
estimating, based at least on the one or more first values, a position of an object indicating a distance between the object and the touch sensor;
applying voltage to one or more first electrodes of the touch sensor, the first electrodes operable, when operated by a controller, to capacitively couple with one or more second electrodes of the touch sensor across an insulator;
measuring one or more second values indicating the capacitance of one or more of the second electrodes; and
estimating, based at least on the one or more second values, a touch location corresponding to an orthogonal projection of a portion of the object onto the touch sensor.

19. The method of claim 18, wherein:
the one or more first electrodes and the one or more proximity electrodes define a first layer; and
the one or more second electrodes and the one or more shield electrodes define a second layer positioned between the first layer and the display.

20. The method of claim 18, wherein:
the one or more first values are measured using self-capacitance measurements; and
the one or more second values are measured using mutual-capacitance measurements.

21. The method of claim 18, wherein one or more of the second electrodes comprises an outer rim substantially surrounding, from a perspective orthogonal to the touch panel, a respective shield electrode of the plurality of shield electrodes.

22. The method of claim 21, wherein:
each outer rim defines a gap; and
each respective shield electrode is connected to an adjacent shield electrode via a track segment passing through the gap defined by the outer rim of the respective second electrode.

23. The method of claim 18, wherein one or more of the first electrodes comprises an outer rim substantially surrounding, from a perspective orthogonal to the touch panel, a respective proximity electrode of the plurality of proximity electrodes.

24. The method of claim 23, wherein:
each outer rim defines a gap; and
each respective proximity electrode is connected to an adjacent proximity electrode via a track segment passing through the gap defined by the outer rim of the respective first electrode.

25. The method of claim 18, further comprising applying voltage to the one or more shield electrodes at least during the application of voltage to the one or more proximity electrodes.

* * * * *